(12) United States Patent
Lamb

(10) Patent No.: US 9,731,779 B2
(45) Date of Patent: Aug. 15, 2017

(54) ALL TERRAIN, LOAD CARRYING CART

(71) Applicant: Zachary Lamb, Baltimore, MD (US)

(72) Inventor: Zachary Lamb, Baltimore, MD (US)

( * ) Notice: Subject to any disclaimer, the term of this patent is extended or adjusted under 35 U.S.C. 154(b) by 304 days.

(21) Appl. No.: 14/532,376

(22) Filed: Nov. 4, 2014

(65) Prior Publication Data
US 2016/0121943 A1    May 5, 2016

(51) Int. Cl.
| | | |
|---|---|---|
| *B62D 51/00* | (2006.01) |
| *B62B 3/02* | (2006.01) |
| *B62B 5/00* | (2006.01) |
| *B62B 3/00* | (2006.01) |

(52) U.S. Cl.
CPC ............ *B62D 51/005* (2013.01); *B62B 3/007* (2013.01); *B62B 5/0033* (2013.01); *B62D 51/001* (2013.01); *B62B 2202/52* (2013.01); *B62B 2301/25* (2013.01)

(58) Field of Classification Search
CPC ....... B62B 3/02; B62B 5/0006; B62B 5/0013; B62B 5/0033; B62B 2205/0033; B62B 2205/30; B62B 2205/00; B62B 2205/006; B62B 3/007; B62B 2202/52; B62D 51/00; B62D 51/008; B62D 51/04; B62D 33/04; B62D 51/005
USPC ............... 190/110, 107; 180/208, 19.1–19.3; 280/37, 651, 47.35, 47.371, 79.3, 30
See application file for complete search history.

(56) References Cited

U.S. PATENT DOCUMENTS

| | | | | | |
|---|---|---|---|---|---|
| 1,683,029 | A | * | 9/1928 | Fanger | B62B 5/0083 190/900 |
| 2,865,647 | A | * | 12/1958 | Wilson | A47B 31/00 248/98 |
| D357,103 | S | * | 4/1995 | Teifel | D34/19 |
| 5,915,723 | A | * | 6/1999 | Austin | B62B 3/02 280/43 |
| 7,210,545 | B1 | * | 5/2007 | Waid | B60K 7/0007 180/19.1 |
| 7,762,363 | B1 | * | 7/2010 | Hirschfeld | B60K 1/04 180/65.1 |
| 8,286,739 | B2 | * | 10/2012 | Oliphant | H01M 10/44 180/65.1 |
| 8,915,504 | B1 | * | 12/2014 | Seibert | B62B 1/10 280/47.16 |
| 8,998,219 | B1 | * | 4/2015 | Sellers | D06F 95/002 280/35 |
| 2004/0216933 | A1 | * | 11/2004 | Coale | B62D 51/04 180/19.1 |
| 2008/0041644 | A1 | * | 2/2008 | Tudek | B60L 7/12 180/65.1 |

(Continued)

*Primary Examiner* — Anne Marie Boehler
(74) *Attorney, Agent, or Firm* — The Law Office of Jerry D. Haynes

(57) ABSTRACT

An all-terrain, load carrying cart to transport items comprising: a housing; a set of all-terrain wheels mounted beneath the housing, where the set of all-terrain wheels allow transport over a variety of terrain; a motor fastened to the housing and coupled to the set of all-terrain wheels, where the motor is rechargeable; and a handle attached to an end of the housing on a telescopic post, where the handle includes a set of control functions to operate the motor and drive the set of all-terrain wheels. The housing includes a set of pockets to comprise the walls therefore providing additional storage for the cart.

11 Claims, 1 Drawing Sheet

(56) References Cited

U.S. PATENT DOCUMENTS

2008/0135364 A1* 6/2008 Chang .................. A45C 5/06
  190/103
2012/0160577 A1* 6/2012 Anasiewicz ........... B62D 51/04
  180/19.1

* cited by examiner

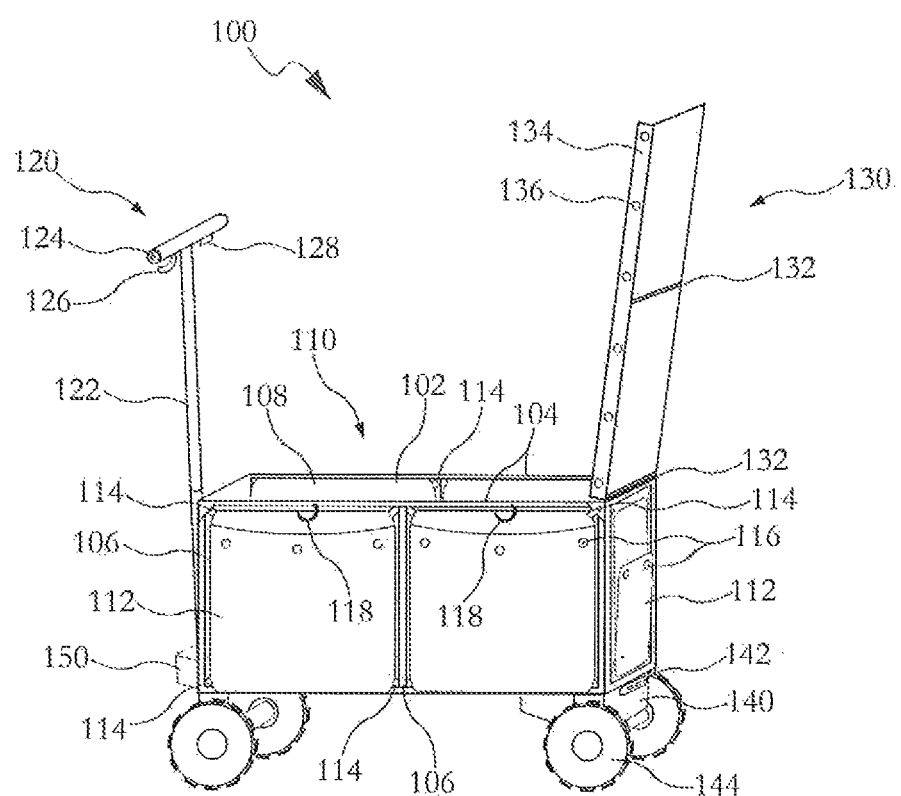

ALL TERRAIN, LOAD CARRYING CART

BACKGROUND OF THE INVENTION

Field of the Invention

The present invention relates to a cart with enlarged wheels able to transport items over sand when at the beach.

Description of Related Art

Going to the beach and spending time outdoors is a great way to share time with family and friends. Gathering on a nice sunny day puts everyone in a good mood making the get together even more enjoyable. Because most people want to make the most of their time on the sand, they must haul armfuls of equipment and gear to their desired location. This is often a daunting and exhausting task transporting food, coolers, chairs, towels, umbrellas, surfboards, sun protection and the like. Further, if the people have kids all of their toys and snacks must be carried to ensure they have fun while spending the day by the water. Because of all the equipment that must be carried, many people avoid going to the beach very often.

Recently some developments have been made to assist beach goers in hauling their gear. For example, many coolers have wheels so that the user is able to wheel their items from their vehicle. While this provides help on the asphalt and sidewalk, the small wheels on the cooler often get stuck in the sand making transport frustrating and exhausting. Similarly, beach carts or wagons are available that have larger wheels allowing the person to load all their items in the wagon. The large wheels traverse the sand must more efficiently to arrive at the desired spot. While these wagons are helpful the user may still become tired pulling all the heavy equipment over the unstable sand.

Therefore it would be desirable in the art to provide a beach cart that easily transports the user's gear over the sand. It would also be desirable in the art to provide a beach cart that is easily storable so that it doesn't take up large areas when not in use.

SUMMARY OF THE INVENTION

In view of the foregoing disadvantages inherent in the prior art, the general purpose of the present invention is to provide an all-terrain, load carrying cart to transport items, configured to include all of the advantages of the prior art, and to overcome the drawbacks inherent therein.

Accordingly, an object of the present invention is to provide an all-terrain load carrying cart with a motor that drives a set of all-terrain wheels over the sand when going to the beach.

Another object of the present invention is to provide an all-terrain, load carrying cart that includes a collapsible housing that enables a compact form for storage.

To achieve the above objects, in an aspect of the present invention, an all-terrain, load carrying cart is described comprising: a housing; a set of all-terrain wheels mounted beneath the housing, where the set of all-terrain wheels allow transport over a variety of terrain; a motor fastened to the housing and coupled to the set of all-terrain wheels, where the motor is rechargeable; and a handle attached to an end of the housing on a telescopic post, where the handle includes a set of control functions to operate the motor and drive the set of all-terrain wheels. The housing includes a set of pockets to comprise the walls therefore providing additional storage for the cart.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawing in which:

The FIGURE depicts a perspective view of an all-terrain, load carrying cart in accordance with an exemplary embodiment of the present invention.

DETAILED DESCRIPTION OF THE DRAWINGS

The present invention relates to a cart with enlarged wheels able to transport items over sand when at the beach. The present invention provides an all-terrain, load carrying cart to facilitate the process of transporting supplies and equipment at the beach. The all-terrain, load carrying cart comprises a wagon with durable and removable sides. The wagon is propelled on a set of all-terrain wheels that are powered by a motor for easy maneuverability. With the all-terrain, load carrying cart the user is afforded a useful buggy able to easily transport all of their outdoor belongings.

Turning now descriptively to the drawings, referring to the FIGURE, an all-terrain, load carrying cart 100 is shown in accordance with an exemplary embodiment of the present invention. The all-terrain, load carrying cart 100 includes a housing 110 comprised of a framed body 102. The framed body 102 is made up from a set of horizontal bars 104 and a set of vertical bars 106 surrounding a base panel. The horizontal bars 104 and the vertical bars 106 may be detachable or collapsible upon themselves to collapse the framed body 102 for storage. The framed body 102 may be made from plastic or aluminum so that it is durable and waterproof, while also being lightweight.

The sides or walls of the framed body 102 may be formed by removable pockets 112 positioned on every side of the housing 110. A pair of pockets 112 may be positioned on each of the lateral portions of the housing 110, and a single pocket 112 may be positioned at each end of the housing 110, as illustrated in the FIGURE. The pockets 112 and base panel positioned within the horizontal bars 104 and vertical bars 106 create the inner portion 108 of the housing 110 where all the beach/outdoor equipment and gear are placed. The pockets 112 may be attached to the framed body 102 with a plurality of fasteners 114 at the intersections where the horizontal bars 104 meet the vertical bars 106. The fasteners 114 may be snaps, hook and loop fasteners (Velcro®), ties, hooks or the like, so that the pockets 112 are removable from the framed body 102. The pockets 112 are made from a durable, waterproof fabric so that they may be washed after removal from the housing 110. The pockets 112 may include a plurality of closures 116 to keep the opening to the pockets 112 shut until opened to remove an item. The closures 116 may be snaps or hook and loop fasteners. Finally, attached to the horizontal bars 104 of the framed housing 102 may be a set of flip-out hooks 118. The hooks 118 allows the housing 110 to support folding chairs, an umbrella, a bicycle or similar objects that may be too large to fit into the inner portion 108 of the housing 110.

At a front end of the housing 110 may be a handle 120. The handle 120 may be height adjustable on a telescopic post 122. The handle 120 may include a throttle 124, a brake 126 and a forward/reverse button to operate a motor 140 coupled to a set of wheels 144. The throttle 124 allows the user to accelerate the speed of the housing, while the brake 126 immediately slows or stops the wheels 144. Both the throttle 124 and brake 126 provide the user with complete control over how the cart 100 is maneuvered while heading to their destination.

Attached to an opposite end of the housing 110 from the handle 120 may be a cover 130 or lid attached on a hinge 132. The cover 130 may be partitioned into two pieces with a hinge 132 in the middle. Alternatively, the cover 130 may be a roll-up type that extends and retracts from the end where it is attached. Along each side of the cover 130 may be a flap 134. The flap may fasten to the closures 116 on the pockets 112 of the housing 110 with a plurality of lid closures 136. The lid closures 136 coordinate with the pocket 112 closures 116 as either snaps or hook and loop fasteners. The closures 136, 116 ensure that the cover 130 remains closed when positioned over the housing 110.

Positioned beneath the housing 110, between the rear wheels 144, may be the motor 140. The motor 140 drives the wheels 144 at the desired speed of the user. The wheels 144 may be large, all-terrain, shock-absorbing, interchangeable wheels able to smoothly traverse a variety of terrain. The motor 140 is battery operated with rechargeable batteries. A charging station 142 may be incorporated into the motor 140 so that the cart 100 can be recharged by plugging it into an outlet. A bumper 150 may be included to protect the cart 100 from damage if struck by an object or structure. The bumper 150 may be positioned below the telescopic post 122 and/or a second bumper (not illustrated for simplicity) may be positioned over the motor 140 to protect and prevent damage to the motor 140. The bumper 150 may made from solid rubber to prevent damage to the cart 100 and objects struck.

With the all-terrain, load carrying cart the user is afforded a wheeled, container that simplifies the task of transporting items from the vehicle to the beach. The collapsible housing may comprise the dimensions of 3 feet in length, 1.8 feet in height and 1.5 feet in width. The throttle, brake and forward/reverse controls on the handle make maneuvering easy over any encountered terrain. By loading their items into the all-terrain, load carrying cart, the users are able to effortlessly tote various supplies to and from the beach and/or outdoor destinations without experiencing physical strain.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. An all-terrain, load carrying cart to transport items comprising:
   a. a housing, where the housing comprising:
      i. a framed body, where the framed body is composed of a set of horizontal bars and a set of vertical bars surrounding a base panel;
      ii. a set pockets on each side of the framed body, where the pockets create walls of the housing; and
      iii. a cover attached to an end of the framed body, where the cover is partitioned into two pieces attached with a hinge;
   b. a set of all-terrain wheels mounted beneath the housing, where the set of all-terrain wheels allow transport over a variety of terrain;
   c. a motor fastened to the housing and coupled to the set of all-terrain wheels, where the motor is rechargeable; and
   d. a handle attached to an end of the housing on a telescopic post, where the handle includes a set of control functions to operate the motor and drive the set of all-terrain wheels.

2. The all-terrain, load carrying cart according to claim 1, where the set of pockets are arranged with two pockets on each lateral portion of the framed body, and a single pocket on each end of the framed body.

3. The all-terrain, load carrying cart according to claim 1, where the set of pockets include a plurality of fasteners to attach the pockets to the framed body therefore allowing the set of pockets to be removable.

4. The all-terrain, load carrying cart according to claim 3, where the fasteners are selected from a group consisting of a snap, hook and loop fastener, hooks or ties.

5. The all-terrain, load carrying cart according to claim 3, where the framed body is collapsible by detaching the set of horizontal bars and vertical bars, and removing the set of pockets.

6. The all-terrain, load carrying cart according to claim 1, where the handle includes a throttle, a brake and a forward/reverse button to operate the motor.

7. The all-terrain, load carrying cart according to claim 1, where the cover is attached on a hinge.

8. The all-terrain, load carrying cart according to claim 1, where the cover includes a flap on each side, where the flaps include a plurality of closures that fasten the flaps to the pockets.

9. The all-terrain, load carrying cart according to claim 1, where the housing includes a bumper at a front end.

10. The all-terrain, load carrying cart according to claim 1, where the housing includes a pair of hooks attached to the horizontal bars, where the pair of hooks support carrying large objects along a side of the housing.

11. The all-terrain, load carrying cart according to claim 1, where the set of pockets include a plurality of closures to shut the pockets.

* * * * *